United States Patent [19]

Bruttel et al.

[11] Patent Number: 5,073,295

[45] Date of Patent: Dec. 17, 1991

[54] ENCAPSULATED FLUORESCENT WHITENING AGENT, PHOTOATIVATOR OR ANTI-MICROBIAL AGENT

[75] Inventors: Beat Bruttel, Böckten; Petr Kvita, Reinach, both of Switzerland

[73] Assignee: Ciba-Geigy Corporation, Ardsley, N.Y.

[21] Appl. No.: 547,715

[22] Filed: Jul. 3, 1990

Related U.S. Application Data

[62] Division of Ser. No. 286,547, Dec. 19, 1988, Pat. No. 4,961,755.

[30] Foreign Application Priority Data

Dec. 29, 1987 [CH] Switzerland ................ 5092/87

[51] Int. Cl.$^5$ ............... C09B 67/02; C11D 3/39; D06L 3/12; B01J 2/30
[52] U.S. Cl. ............... 252/301.19; 252/588; 252/700; 427/212; 428/357; 428/403; 540/122; 540/139; 540/140
[58] Field of Search ............... 8/526, 552, 648; 252/309.19; 540/140; 427/212; 428/357

[56] References Cited

U.S. PATENT DOCUMENTS

| | | | |
|---|---|---|---|
| 4,457,858 | 7/1984 | Saran | 252/182 |
| 4,548,610 | 10/1985 | Preiswerk et al. | 8/101 |
| 4,713,079 | 12/1987 | Chun et al. | 8/101 |
| 4,961,755 | 10/1990 | Bruttel et al. | 8/526 |
| 4,990,280 | 2/1991 | Thorengaard et al. | 252/95 |
| 5,030,244 | 7/1991 | Neumann | 8/526 |

FOREIGN PATENT DOCUMENTS

| | | |
|---|---|---|
| 273775 | 7/1988 | European Pat. Off. |
| 333270 | 9/1989 | European Pat. Off. |
| 345765 | 12/1989 | European Pat. Off. |

*Primary Examiner*—A. Lionel Clingman
*Attorney, Agent, or Firm*—Kevin T. Mansfield; Edward McC. Roberts

[57] ABSTRACT

There are disclosed coated active substances and a process for the preparation thereof, wherein said active substances are dyes, fluorescent whitening agents, photoactivators and/or textile microbicides, if appropriate together with extenders, dispersants, buffers, stabilizers and/or other auxiliaries.

15 Claims, No Drawings

ENCAPSULATED FLUORESCENT WHITENING AGENT, PHOTOATIVATOR OR ANTI-MICROBIAL AGENT

This is a divisional of application Ser. No. 286,547 filed on Dec. 19, 1988 now U.S. Pat. No. 4,961,755.

The present invention relates to coated active substances and to a process for the preparation thereof, said active substances being dyes, fluorescent whitening agents, photoactivators and/or textile microbicides, if appropriate together with extenders, dispersants, buffers, stabilisers and/or other auxiliaries.

It is common knowledge that the above active substances per se, depending on how they are handled, can be harmful to people and machines or can be made unfit for use by decomposition caused by storage with, for example, other chemicals.

By coating these active substances with suitable coating agents it is possible to achieve a substantially safer and simpler handling as well as excellent protection against decomposition, and to keep them apart from other components, for example in detergent compositions.

Accordingly, the present invention relates to a coated active substance comprising at least one dye, fluorescent whitening agent, photoactivator and/or textile microbicide, if appropriate in conjunction with extenders, dispersants, buffers, stabilisers and/or other auxiliaries.

The term "active substance" will be understood as meaning a wide range of dyes, fluorescent whitening agents, photoactivators and textile microbicides and mixtures thereof. These substances may be water-soluble as well as water-insoluble. The water-soluble substances are preferred.

The eligible water-soluble dyes may be anionic and cationic dyes such as chrome dyes, developing dyes and mordant dyes and, in particular, metal complex dyes and reactive dyes. Most particularly, they are sulfonated or carboxylated non-metallised or metallised and metallisable monoazo, disazo and polyazo dyes, pyrazolone, thioxanthone, oxazine, stilbene and formazan dyes, and anthraquinone, nitro, methine, triphenylmethane, xanthone, naphthazarine, styryl, azastyryl, naphthoperinone, quinonaphthalone and phthalocyanine dyes, as well as those dyes which contain at least one fibre-reactive radical in the dye molecule.

The anionic dyes are preferably alkali metal salts or ammonium salts of so-called acid wool dyes, or reactive dyes or of substantive dyes of the azo, anthraquinone and phthalocyanine series. Examples of suitable azo dyes are metallised or non-metallised monoazo and disazo dyes and also formazan dyes which contain one or more sulfonic acid groups. Preferred anthraquinone dyes are 1-amino-4-arylaminoanthraquinonesulfonic acids.

Suitable metal complex dyes are preferably metal complex dyes which contain sulfo or carboxyl groups, for example 1:1 or 1:2 metal complexes of azo or azomethine dyes or metallised phthalocyanines, especially copper and nickel phthalocyanines. The 1:1 and 1:2 metal complexes are preferably 1:1 nickel complexes, 1:1 cobalt complexes, 1:1 copper complexes, 1:1 chromium complexes, 1:1 iron complexes or symmetrical or asymmetrical 1:2 cobalt complexes, 1:2 iron complexes or 1:2 chromium complexes of, preferably, o-carboxy-o'-hydroxyazo, o-hydroxy-o'-aminoazo or o,o'-dihydroxyazo dyes of the benzeneazobenzene, naphthaleneazonaphthalene, benzeneazonaphthalene, benzeneazopyrazolone, benzeneazopyridone or benzeneazoacetoacetamide type, which groups may be unsubstituted or substituted. Suitable substituents are, for example: substituted or substituted sulfamoyl or sulfonyl, halogen or nitro.

The eligible copper and nickel phthalocyanines are derived from the customary mixtures of different degrees of sulfonation and contain preferably 2 to 3 or also 4 sulfated $\beta$- or $\gamma$-hydroxyalkylsulfonamido groups, and may also contain in addition individual halogens and individual sulfonamido groups, which last mentioned groups are unsubstituted or substituted at the nitrogen by, for example, lower alkyl such as methyl, ethyl, propyl, butyl or lower hydroxyalkyl groups, for example 2-hydroxyethyl, 2-hydroxypropyl or 3-hydroxypropyl.

The sulfonated azo dyes will be conveniently used in the form of their metal salts, for example of the potassium, ammonium, lithium or, preferably, sodium salts and mixtures thereof.

Suitable fibre-reactive groups present in the reactive dyes are, for example, heterocyclic groups or an acyl group of a carboxylic acid, which groups carry at least one halogen atom which is removable under the dyeing conditions. Exemplary of such groups are: s-triazinyl radicals which carry one or two halogen atoms such as chlorine, fluorine or bromine atoms at the triazine ring, pyrimidyl radicals which carry one to three halogen atoms such as chlorine and/or fluorine atoms or one or two arylsulfonyl or alkylsulfonyl groups at the pyrimidine ring, and dichloroquinoxylinyl, 2-chlorobenzthiazolyl, chloroacetylamino or $\alpha,\beta$-dibromopropionylamino groups.

Examples of fibre-reactive groups of the vinylsulfone series are, in addition to the vinylsulfonyl group itself, aliphatic sulfone groups which carry in $\beta$-position to the sulfone group a group which is removable under alkaline conditions, such as a halogen atom or an ester radical of an acid, for example the $\beta$-chloroethylsulfonyl, $\beta$-acetoxyethylsulfonyl, $\beta$-(3-sulfobenzoyloxy)ethylsulfonyl, $\beta$-sulfatoethylsulfonyl, $\beta$-thiosulfatoethylsulfonyl, $\beta$-phosphatoethylsulfonyl, $\beta$-sulfateoethylsulfonylmethylamino, vinylsulfonylmethylamino, 4-vinylsulfonylbutyryl, 4-chloroethylsulfonylbutyryl, vinylsulfonylethoxyethylamino group or the 4-$\beta$-sulfatoethylsulfonylanilino group.

Further suitable fibre-reactive groups are, for example, halocyclobutane, mono- or bis($\gamma$-halo-$\beta$-hydroxypropyl)amino groups, $\beta$-haloethylsulfamido groups, $\beta$-haloethoxy groups, $\beta$-haloethylmercapto groups, $\gamma$-halo-$\beta$-hydroxypropylsulfamido groups or 2,3-epoxypropyl groups.

The basic dyes are the customary salts and metal halide double salts, for example zinc chloride double salts, of the known cationic dyes, preferably of the methine or azamethine series that contain, for example, an indolinium, pyrazolium, imidazolium, triazolium, tetrazolium, oxadiazolium, thiodiazolium, oxazolium, thiazolium, pyridinium, pyrimidinium or pyrazinium ring.

The above heterocycles can be unsubstituted or substituted and/or fused with aromatic rings. Also suitable are cationic dyes of the diphenylmethane, triphenylmethane, oxazine, thiazine and 1,2-pyran series and, finally, dye salts of the arylazo and anthraquinone series.

The sparingly soluble or water-insoluble dyes eligible for use in the practice of this invention are, for example, sulfur dyes or pigment dyes, and especially disperse dyes and, first and foremost, vat dyes, which belong to a very wide range of chemical classes.

The disperse dyes are, for example, nitro, aminoketone, ketoneimine, methine, polymethine, diphenylamine, quinoline, benzimidazole, xanthene, oxazine, aminonaphthoquinone or coumarin dyes that are devoid of sulfo and/or carboxyl groups, and are preferably anthraquinone and azo dyes such as monoazo or disazo dyes. The vat dyes are dyes which can be applied to the fabric in solid, dispersed form and which, after development, are present once more in water-insoluble form.

Aside from individual dyes, it is, of course, also possible to use mixtures of dyes, in which case combinations of water-insoluble or sparingly soluble dyes with water-soluble dyes are possible.

The fluorescene whitening agents are anionic, cationic, non-ionic and amphoteric compounds or mixtures thereof, for example of the class of the distyrylbenzenes or distyrylbiphenyls, coumarins, benzocoumarins, pyrazines, pyrazolines, oxazines, mono- or dibenzoxazolyls, mono- or dibenzimidazolyl compounds as well as naphthalimides, styrene derivatives, naphthotriazole derivatives and v-triazole derivatives, and especially also stilbene compounds such as cyanur derivatives of 4,4'-diaminostilbene-2,2'-disulfonic acid.

The photoactivators are, for example, non-metallised or metallised phthalocyanine compounds, preferably aluminium, zinc and/or germanium phthalocyanine compounds.

Textile microbicides are, for example, compounds of the class of the pyrethroids, diphenylureas, phenolcarbamoylbarbiturates, pyridyloxysulfonanilides, azolyls, phenylacetic acid esters, benzimidazoles, aromatic sulfonamides and/or phosphates and phosphonates.

The eligible dyes, fluorescent whitening agents, photoactivators and textile microbicides are known and can be prepared by known methods.

The active substances cited above may also be formulated together with extenders, dispersants, buffers, stabilisers and/or further auxiliaries. Example of further auxiliaries are wetting agents, solubilisers, textile, dyeing and application auxiliaries, as well as antifoams. All these auxiliaries may not interact with the cited dyes, fluorescent whitening agents, textile microbicides or photoactivators.

The coating material likewise comprises a wide range of materials or mixtures, for example water-soluble surfactants, hydrocarbons, polymers, waxes, fats, gelatin, paraffins and/or hydrogenated oils, if appropriate in conjunction with binders, water-insoluble dyes, solubilisers and/or agents for reducing the melting point. The appropriate coating material or mixture will depend on the intended utility of the active substances or mixture thereof, for example as a component of detergent compositions, as a composition for home dyeing or as an industrial dye.

In particular, however, the coating materials employed will have a melting point of >40° C. and dissolve or disperse rapidly in water in the temperature range from 10° to 130° C. and/or melt in the temperature range from 40° to 130° C.

Preferred coating materials are gelatin, sugar syrup and starch syrup, synthetic cellulose esters and ethers, carboxymethyl cellulose, polyethylene glycols, polyvinyl pyrrolidones, polyvinyl alcohols, polyacrylic acids, polyvinyl acetates, polysaccharides, glycerides, in particular the fatty acid esters and fatty alcohols containing more than 18 carbon atoms and having a melting point of over 40° to 100° C., preferably the even-numbered aliphatic alcohols of 16 to 36 carbon atoms, solid paraffins having melting points of 40° to 100° C., water-soluble anionic, non-ionic and amphoteric surfactants, especially those that are wax-like and have a melting point of 40° to 100° C., beeswax, cerates, wool wax, lanolin, hydrogenated groundnut oil or mixtures of said substances. These substances are known and described, for example, in U.S. Pat. No. 3,423,489; R. Büttiker, Chimia 31 (77), No. 8, 301; H. Stucker, Pharmazeutische Technologie, Georg Thieme Verlag. Stuttgart, 1978; and H. List, Arzneiformenlehre, Wissenschaftliche Verlagsgesellschaft, Stuttgart, 1985.

Particularly interesting coating materials are N-alkylbetaines, polyoxyethylene alkylamino ethers, ethoxylated stearyldiphenyloxyethyl diethylenetriamine, higher saturated and unsaturated fatty acids (for example stearic acid and oleic acid) and the sodium and potassium salts thereof, diglycerol esters of higher fatty acids (for example glycerol-1,3-dipalmitate), alkylaryl ethoxylates, dialkylnaphthalenesulfonates, alkylmethyl taurides, condensate of naphthalenesulfonate and formaldehyde, nonylphenoxypoly(ethyleneoxy)ethanol, block copolymers of ethylene oxide/propylene oxide as well as propylene oxide/ethylene oxide, saturated and unsaturated fatty alcohol ethoxylates, preferably linear $C_{16}$-$C_{18}$ fatty alcohol ethoxylates, alkylphenol ethoxylates, copolymers of vinyl pyrrolidone with, for example, propionic acid or vinyl acetate, polyvinyl pyrrolidones, block polymers obtained by the polycondensation of propylene oxide and ethylene oxide with ethylenediamine, ethoxylated fatty alcohol polyglycol ethers with $\geq 10$ mol of ethylene oxide, polyethylene glycols having molecular weights of >2700, modified, partially saponified or completely saponified polyvinyl alcohols, imidazoline derivatives, N-alkyl-3-aminopropionates, N-alkyl-3-iminopropionates, polyvinyl ethers, preferably polyvinylalkyl ethers containing $C_2$-$C_{10}$alkyl groups, polymers of $\alpha,\beta$-unsaturated carbonyl monomers which contain N-methylolacrylamide preferably in the form of salts or acids and having molecular weights in the range from 20 000 to 1000 000, acrylic polymers of formula

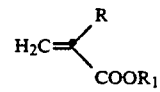

in which R is H, $C_1$-$C_{30}$alkyl, aryl, arylalkyl, cycloalkyl and $R_1$ is H, $C_1$-$C_{12}$alkyl, cycloalkyl, aryl, arylalkyl or mixtures of the above substances with one another.

The coating material may further contain water-insoluble dyes, agents for reducing the melting point and/or solubilisers, for example hydroxypropylmethyl cellulose, hydroxypropyl cellulose, starch, carboxymethyl starch, alginates, for example sodium alginate and galactomannan.

It is especially convenient to use as coating material those substances which exhibit further desired properties, for example as dispersants, textile, dyeing or application auxiliaries. The substances in this case need no longer be mixed with the active substance before coating or, for example, added to the dye bath.

The thickness of the layer coating the active substance or mixture thereof is 0.002 mm to 3 mm, preferably 0.02 to 2 mm. The amount of coating material is preferably equal to or less than the amount of active substance or mixture thereof, and the entire layer may be composed of several individual layers of different coating materials.

The invention further relates to a process for the preparation of coated granules, which comprises granulating, if appropriate homogenising and/or compacting an active substance or a mixture of active substances and subsequently coating said substance or mixture thereof with a water-soluble or rapidly dispersible and/or low melting coating agent. What has been said at the outset applies by analogy to the active substance and the coating agent.

The process of this invention is preferably a multi-step process. In the first step, the solution or suspension or the active substance obtained in the synthesis in the form of a solid or a filter cake made into a paste, or the purified, ready formulated and/or homogenised active substance or mixture of active substance, is subjected to a granulation process, for example a melt granulation, spray granulation, fluidised-bed granulation, extrusion granulation, cube dicing granulation, coacervation granulation, roller press granulation, compacting, pelletising, spinning disc granulation, cooling conveyor granulation, roller granulation, turbine generator granulation and/or perforated disc granulation. If desired, the granules so obtained can be subsequently homogenised, compacted, and spheronised, preferably, for example, in a Marumerizer ®. The finely particulate material having a granular size of <80 μm is separated and, if desired, returned to the granulation process.

The coating of the active substance of mixture of active substances with a suitable coating machine, for example a known apparatus as used in pharmaceutical technology or biotechnology, is carried out in the second step. This coating machine and the coating technique to be chosen are governed by the coating material to be used. For coating, it is preferred to use granules having a particle size of 80-2000 μm, especially 200-700 μm. Coating is carried out, for example, in a fluidised bed with cooler and/or drier, in a pan coating apparatus with coating pans and polishing drums of different shapes, and with manual or automatic pouring or spraying of the coating materials which are dissolved in water or organic solvents or are in the melt state, for example by the hot coating or cold coating process [Heinz Sucher, Pharmazeutische Technologie, Georg Thieme Verlag Stuttgart, 1978, page 425 et seq.]. The thickness of the coating covering the granules of the active substance is 0.002 mm to 3 mm, the amount of coating material being equal to or less than the amount of active substance or mixture thereof. The second step is conveniently combined with a sifting operation, in which any coarse or fine-grain particles left after the coating are separated from the fraction containing particles having a particle size of 80-2000 μm.

It is also possible to coat the filter cake or the active substance in powder form direct if the fine-grain product having a particle size of <80 μm is separated beforehand.

The coated active substances or mixtures thereof are abrasion-resistant, free-flowing, dustless and very suitable for metered addition.

The invention is illustrated by the following non-limitative Examples, in which parts and percentages are by weight.

EXAMPLE 1

500 ml of an aqueous solution of an aluminium phthalocyanine (8% active content), 100 g of sodium sulfate, 50 g of a dispersant of formula

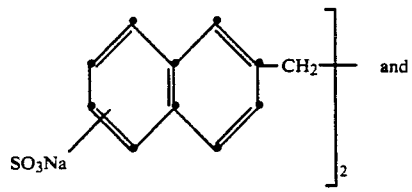

and 2 g of ethoxylated stearyldiphenyloxyethyl diethylenetriamine are thoroughly mixed and sprayed under pressure on to a fluidised bed at a bed temperature of 65° C. The resultant granulate is further homogenised, compacted and spheronised in a Marumerizer ®. and the granules having a particle size smaller than 200 μm are separated by sifting.

The crude granules are coated with gelatin in a coating drum, the gelatin used as coating material being coloured with a blue or green disperse dye and additionally treated with an adduct of oleyl alcohol which does not contain polyglycol with 4 to 8 mol of ethylene oxide.

The coated granules are then fed to a storage vessel after passage through a cooler and a screen.

The products so obtained can be readily incorporated in detergent compositions, do not stain the detergent composition during storage, and do not soil laundry during washing.

EXAMPLE 2

7 kg of the anthraquinonoe dye, C.I. Acid Blue 239, 2 kg of the dispersant of Example 1 and 1 kg of dextrin are mixed in a Lödige mixer and then ground in a pinned disc mill. The ground, cut dye is compacted in a roller compacter with section rolls. The resultant granules are spheronised in a Marumizer ® and then sifted to separate granular product having a particle size of 100-2000 μm from fine-grain product (particle size <100 μm) and coarse-grain product (particle size <2000 μm). The granules are then charged to a V-mixer fitted with spray nozzle and jacket and warmed to 45° C. With constant mixing, the granules are sprayed with 10% (based on the weight of the dye granules to be coated) of a fused dyeing auxiliary based on ethoxylated stearyldiphenyloxyethyl diethylenetriamine. Upon termination of the coating operation, the coated dye granules are charged to a fluidised bed, where they are cooled with cold air.

Finally, the fraction having a particle size of 100-2000 μm is separated by sifting.

EXAMPLE 3

10 kg of spray dried granules of the monoazo dye, C.I. Reactive Red 184, which has been formulated with conventional auxiliaries for this granulating method, is charged continuously to a fluidised bed. In this fluidised bed, the granules are sprayed with a 5% aqueous solution of an ethylene oxide/propylene oxide block copolymer (containing 80% of polyoxyethylene in the molecule; total of 2% of auxiliary, based on granular product), while simultaneously blowing in warm air of 52° C. The coated granules are continuously fed to a fluidised bed dryer fitted with a cooler. The desired granular fraction (particle size: 80-1200 μm) is separated from the cooled coated granules.

EXAMPLE 4

Fine-grain product is separated by sifting 15 kg of spray dried granules of the dye, Acid Red 361. The granules having a particle size of >100 μm are fed continuously to a fluidised bed. In this fluidised bed, the granules are sprayed with a warm melt of 60° C. of a block copolymer (molecular weight: ca. 12 000) obtained by polycondensation of propylene oxide and ethylene oxide with ethylenediamine (total of 5% by weight of coating agent, based on granular product), while simultaneously blowing in warm air of 55° C. The coated granules are fed continuously to a cooler. The desired granular fraction (particle size: 100-800 μm) is then separated from the coated granules by sifting. The resultant dustless, free-flowing granules are storage-stable for several months.

EXAMPLE 5

5 kg of the compacted granules of the monoazo dye, Reactive Orange 12, are charged to a coating drum and sprayed for 3.5 minutes with 450 g of a 5% by weight solution, warmed to 40° C., of partially saponified polyvinyl alcohol (molecular weight: 50 000) in water. The coated, wet granules are continuously fed to, and dried in, a fluidised bed, and the desired granular product having a particle size of 300-1500 μm is separated by sifting. The coated, free-flowing granules are dustless and abrasion-resistant.

EXAMPLE 6

The fraction having a particle size of 400-1500 μm is separated by sifting from the granules of the monoazo dye, Reactive Orange 29, prepared in a compacting granulator, and 10 kg of these granules are charged to a plow type mixer with jacket. After being warmed to 50° C. with constant slow mixing, the granules are sprayed with a hot melt of 62° C. consisting of 20% by weight of ethoxylated stearyldiphenyloxyethyl diethylenetriamine and 80% by weight of a polyethylene glycol (molecular weight: ~4500). Altogether the granules are coated with 3.5% by weight of the auxiliary (based on the granular product). After the coating, the warm granules are fed continuously to the cooler. The finished granules are dustless and can be readily dissolved in a dye liquor.

EXAMPLE 7

12 kg of the spray dried granules of the monoazo dye, Reactive Orange 91, are fed continuously to a coating drum and sprayed with a 12% aqueous solution of a 1:1 mixture of polyvinyl pyrrolidone and a fatty alcohol polyglycol ether (molecular weight: ~2000). The coated granules are dried in a fluidised bed and then sifted through a screen to separate the granular fraction having a particle size of 100-500 μm. The coated granules have very good resistance to abrasion and are readily soluble in an aqueous dye liquor.

What is claimed is:

1. A coated active substance comprising at least one fluorescent whitening agent, photoactivator or textile microbiocide, in conjunction with optional extenders, dispersants, buffers, stabilizers or other auxiliaries and a coating material, wherein the coating material is a substance or mixture of substances which has a melting point of over 40° C. and dissolves or disperses rapidly in water in the temperature range from 10° to 30° C. and/or melts in the temperature range from 40° to 130° C., which coating material comprises a block copolymer of ethylene oxide and propylene oxide or an ethoxylated stearyldiphenyl-oxyethyl diethylenetriamine.

2. A coated active substance according to claim 1, wherein the active substance is an anionic, cationic, non-ionic or amphoteric fluorescent whitening agent or a mixture thereof.

3. A coated active substance according to claim 2, wherein the fluorescent whitening agent is a compound of the class of the distyrylbenzenes or distyrylbiphenyls, coumarins, benzocoumarins, pyrazines, pyrazolines, oxazines, mono- or dibenzoxazolyls, mono- or dibenzimidazolyl compounds, naphthalimides, naphthotriazole derivatives and v-triazole derivatives, and stilbene compounds.

4. A coated active substance according to claim 1, wherein the active substance is a photoactivator.

5. A coated active substance according to claim 4, wherein the photoactivator is a non-metallised or metallised phthalocyanine compound.

6. A coated active substance according to claim 5, wherein the photoactivator is an aluminum, zinc or germanium phthalocyanine compound.

7. A coated active substance according to claim 1, wherein the active substance is a textile microbicide.

8. A coated active substance according to claim 7, wherein the textile microbicide is a compound of the class of the pyrethroids, diphenylureas, phenolcarbamoylbarbiturates, pyridyloxysulfonanilides, azolyls, phenylacetic acid esters, benzimidazoles, aromatic sulfonamides and/or phosphates and phosphanates.

9. A coated active substance according to claim 1, wherein the active substance is water-soluble.

10. A coated active substance according to claim 1, wherein the coating layer has a thickness of 0.002 μm to 3 mm, and the amount of coating material is less than or equal to the amount of active substance or mixture thereof.

11. A process for the preparation of coated granules, which comprises optionally granulating, homogenizing and/or compacting an active substance or a mixture of active substances, which active substance is a fluorescent whitening agent, photoactivator and/or textile microbicide, in conjunction with optional extenders, dispersants, buffers, stabilizers and/or other auxiliaries and subsequently coating said active substance or mixture thereof with a coating material which is a substance or mixture of substances which has a melting point of over 40° C. and dissolves or disperses rapidly in water in the temperature range from 10° to 30° C. and/or melts in the temperature range from 40° to 130° C.

12. A process according to claim 11, which comprises granulating, homogenising and/or compacting at least one photoactivator and coating it with gelatin in a coating drum.

13. A process according to claim 11, wherein coating is carried out by pouring or spraying the coating material which is dissolved in water or an organic solvent, or is in the melt state, on to the active substance or mixture thereof to a thickness of 0.002 to 3 μm.

14. A process according to claim 11, which comprises coating granules which have a particle size of 80 to 20 000 μm.

15. A process according to claim 11, which comprises coating a photoactivator with gelatin.

* * * * *